United States Patent [19]

Yamada et al.

[11] Patent Number: 5,035,359
[45] Date of Patent: Jul. 30, 1991

[54] DEVICE FOR CHANGING A DIRECTION OF AN AIRSTREAM

[75] Inventors: Minoru Yamada; Nobuo Kobayashi, both of Susono, Japan

[73] Assignee: Toyota Jidosha Kabushiki Kaisha, Japan

[21] Appl. No.: 491,155

[22] Filed: Mar. 9, 1990

[30] Foreign Application Priority Data

Mar. 10, 1989 [JP] Japan .................... 1-27714[U]

[51] Int. Cl.$^5$ .............................................. G01M 9/00
[52] U.S. Cl. ..................................... 239/502; 239/513; 73/147
[58] Field of Search ............... 239/502, 513; 98/40.24, 98/40.3, 121.2; 73/147, 148

[56] References Cited

U.S. PATENT DOCUMENTS 3,301,164 1/1967 Eberhart ..................... 98/40.24

FOREIGN PATENT DOCUMENTS 57-7658 2/1982 Japan .
0107539 6/1985 Japan ........................ 73/147
61-110024 5/1986 Japan .

Primary Examiner—Andres Kashnikow
Assistant Examiner—Karen B. Merritt
Attorney, Agent, or Firm—Finnegan, Henderson, Farabow, Garrett & Dunner

[57] ABSTRACT

A device for changing a direction of an airstream, which comprises a plurality of spaced airstream direction control plates arranged in parallel in a plane perpendicular to the direction of flow of the airstream. The airstream direction control plates are swung about corresponding swing axes positioned at the downstream ends of the airstream direction control plates, to change the direction of flow of the airstream.

6 Claims, 8 Drawing Sheets

FRONT AIRSTREAM
VEHICLE MOVING DIRECTION

CROSS AIRSTREAM — P

P
ΔB

P

P $v=30m/s [v/\omega=0.04m/o]$

10° DEFLECTION
(0.013s)

20° DEFLECTION
(0.027s)

30° DEFLECTION
(0.040s)

30° DEFLECTION
(0.053s)

30° DEFLECTION
(STEADY STATE)

$v = 8 \text{ m/s} \, [v/\omega = 0.01 \text{ m/o}]$

10° DEFLECTION
(0.013s)

20° DEFLECTION
(0.027s)

30° DEFLECTION
(0.040s)

30° DEFLECTION
(0.053s)

30° DEFLECTION
(STEADY STATE)

AIR STREAM

AIR STREAM

DEVICE FOR CHANGING A DIRECTION OF AN AIRSTREAM

BACKGROUND OF THE INVENTION

1. Field of the Invention

The present invention relates to a device for changing the direction of an airstream in, for example, a wind tunnel used for testing aerodynamic designs.

2. Description of the Related Art

When a vehicle is running it is often affected by the impact of a cross wind, i.e., the direction of the force of the airstream on the vehicle body is abruptly changed, and this causes an abrupt change in the various forces of the airstream acting on the vehicle body and this abrupt change affects the running stability of the vehicle. If the various forces caused by a change in the direction of the wind acting on the vehicle body can be detected, it becomes possible to estimate the running stability of the vehicle when the vehicle encounters a cross wind, and thereby obtain useful data for the design of a vehicle.

From the viewpoint of safety, however, as well as the difficulties in obtaining a stable detecting condition, it is difficult to obtain such data when the vehicle is actually running, and therefore, such data is normally obtained by using a wind tunnel in which a state in which the vehicle encounters a cross wind when running can be artificially created, i.e., simulated.

In a known airstream generating device by which the direction of the airstream can be changed, a plurality of spaced airstream direction control plates having a wing shape are arranged in a wind tunnel such that these plates are swingable about the central axes thereof while maintaining a parallel relationship therebetween. (See Japanese Unexamined Patent Publication No. 61-110024.) In this airstream generating device, the airstream direction control plates are periodically swung about the central axes thereof by step motors, to artificially created an airstream from different directions, similar to the air currents in the atmosphere, to observe the behavior of the smoke, discharged from, for example, a factory chimney.

Nevertheless, the movement of air currents in the atmosphere is quite different from the movement of an airstream to which the vehicle is subject when running, and thus, even if this airstream generating device is applied to a device for testing the running stability of the vehicle, it is impossible to artificially create a state simulating the conditions encountered by a vehicle when subjected to a cross wind while running.

SUMMARY OF THE INVENTION

An object of the present invention is to provide a device for changing a direction of an airstream, which device is capable of artificially creating a state which simulates the conditions encountered by a vehicle when subjected to a cross wind while running.

Therefore, according to the present invention, there is provided a device for changing a direction of an airstream by changing the direction of an airstream flowing from an air outlet;

the device comprising: a plurality of spaced airstream direction control plates arranged in parallel in a plane extending perpendicularly to the direction of flow of the air stream, and means for swinging the airstream direction control plates about corresponding swing axes extending along the above plane by a predetermined angular degree from a position where at the airstream direction control plates extend in parallel to the direction of flow of the airstream, the swing axes being positioned on the downstream side of the corresponding airstream direction control plates.

The present invention may be more fully understood from the description of preferred embodiments of the invention set forth below, together with the accompanying drawings.

DESCRIPTION OF PREFERRED EMBODIMENTS

Figure 1:
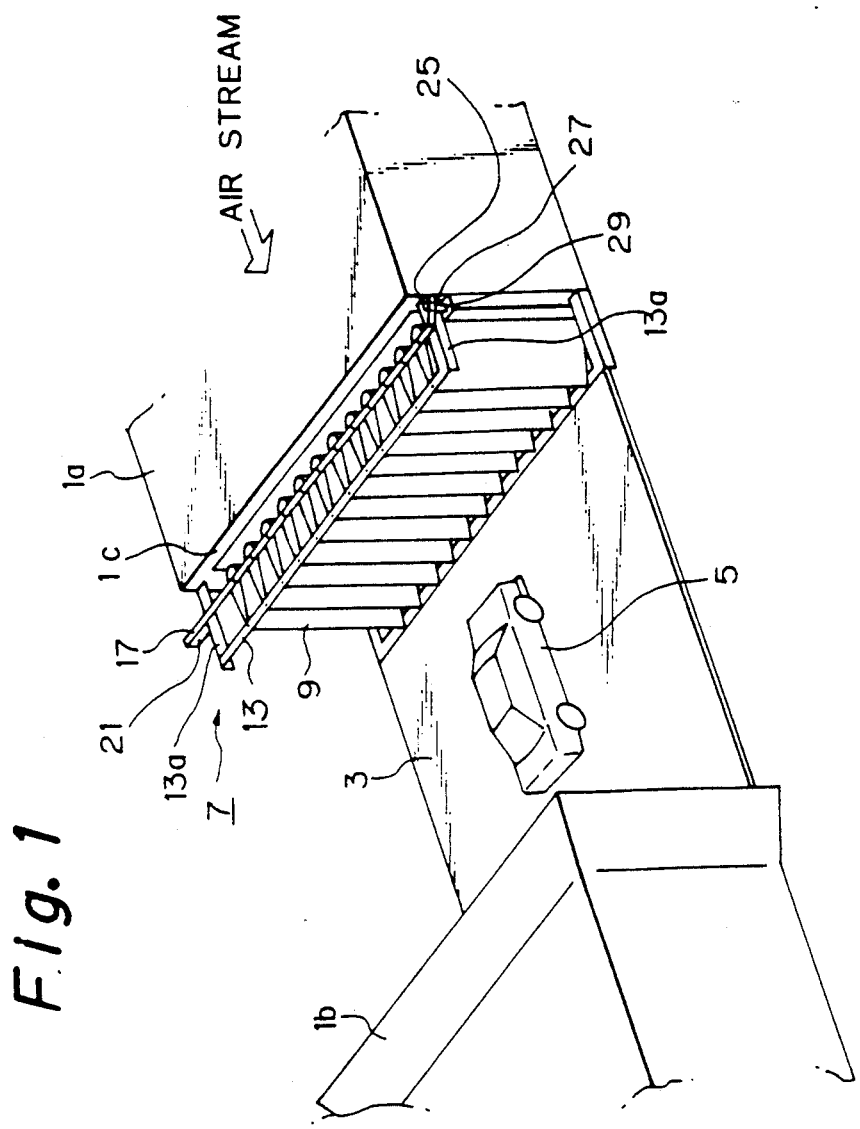
FIG. 1 is a perspective view of a device for changing a direction of an airstream.
Figure 2:
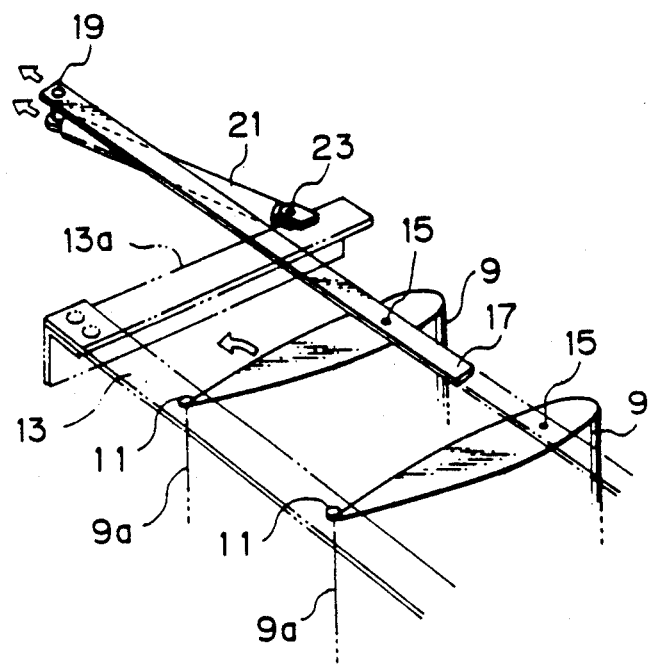
FIG. 2 is a perspective view of a part of a link mechanism of the airstream direction control plates.
Figure 3:
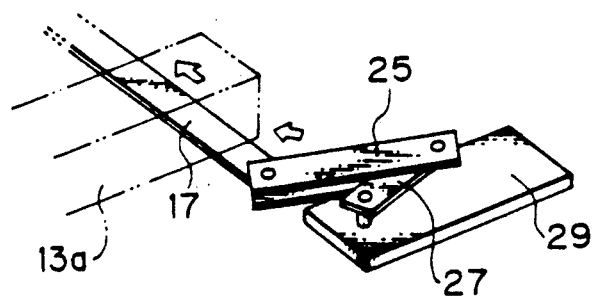
FIG. 3 is a perspective view of another part of the link mechanism of FIG. 2.
Figure 4A:
FIG. 4 (A) through (E) are diagrams illustrating the flow patterns of the airstream to which a vehicle is actually subjected.
Figure 4B:
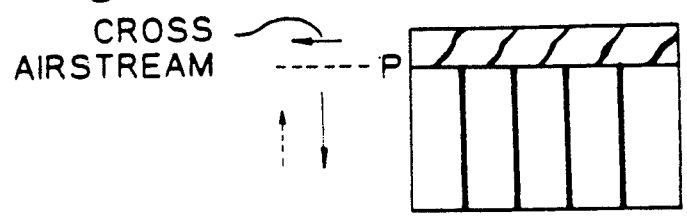
Figure 4C:
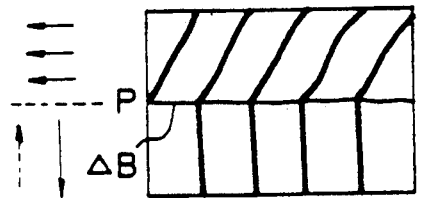
Figure 4D:
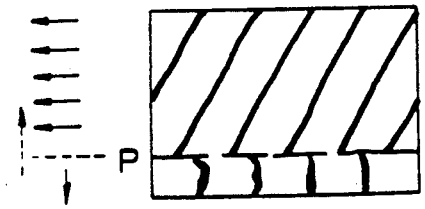
Figure 4E:
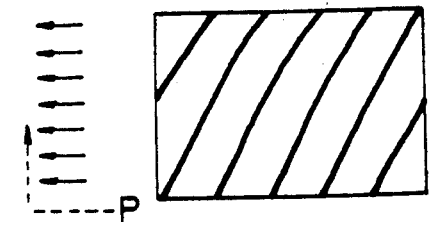
Figure 5A:
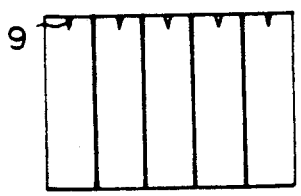
FIG. 5 (A) through (E), 6 (A) through (E), 7 (A) through (E) and 8 (A) through (E) are diagrams illustrating various flow patterns obtained by changing the axis of the swing motion or the angular velocity of the swing motion.
Figure 6A:
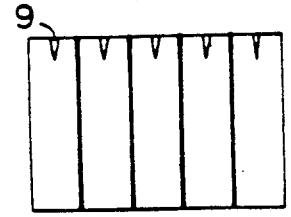
Figure 5B:
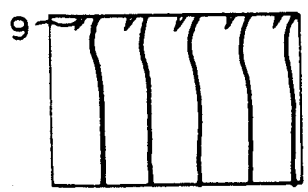
Figure 6B:
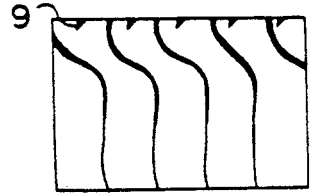
Figure 5C:
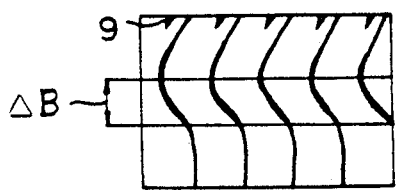
Figure 6C:
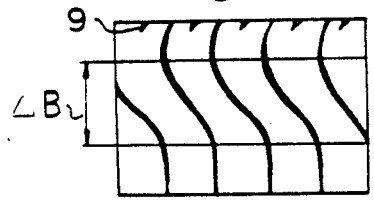
Figure 5D:
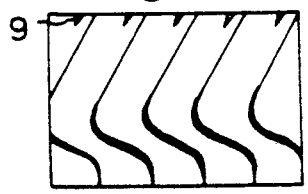
Figure 6D:
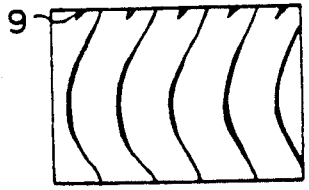
Figure 5E:
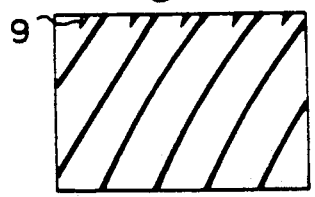
Figure 6E:
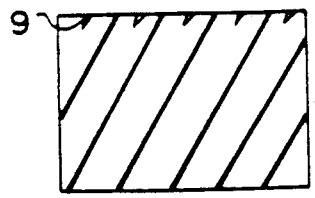
Figure 7A:
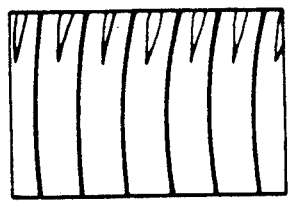
Figure 7B:
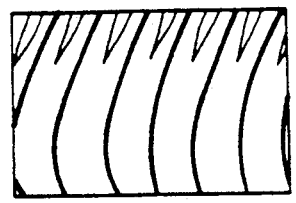
Figure 7C:
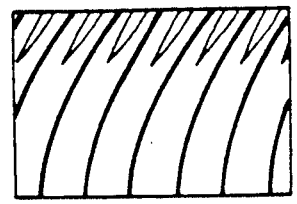
Figure 7D:
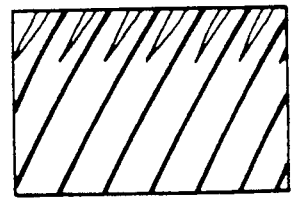
Figure 7E:
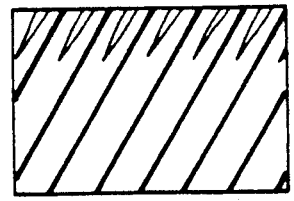
Figure 8A:
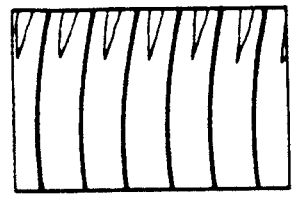
Figure 8B:
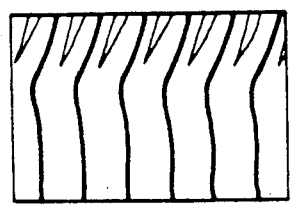
Figure 8C:
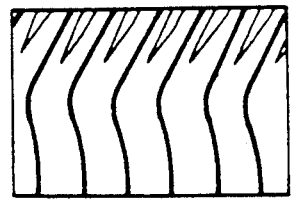
Figure 8D:
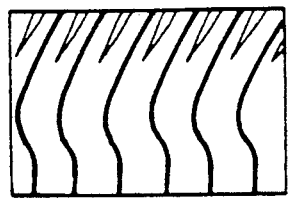
Figure 8E:
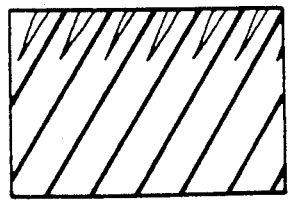
Figure 9A:
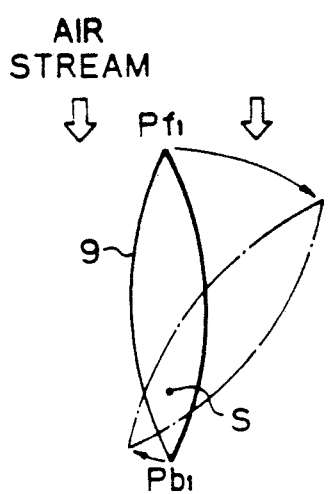
FIG. 9 (A) through (E) are schematically illustrated plan views of the airstream direction control plates.
Figure 9D:
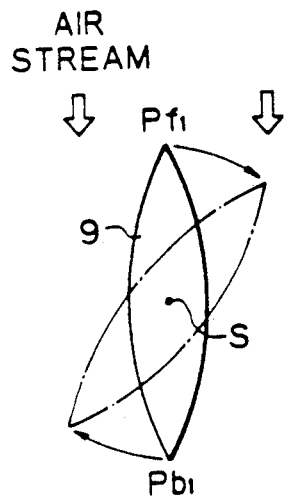
Figure 9E:
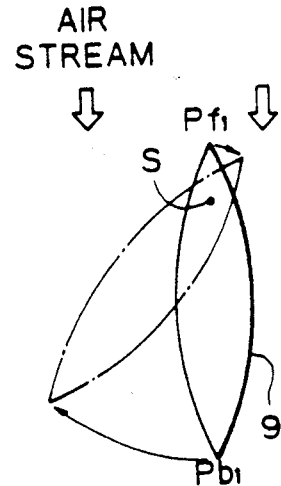
Figure 9B:
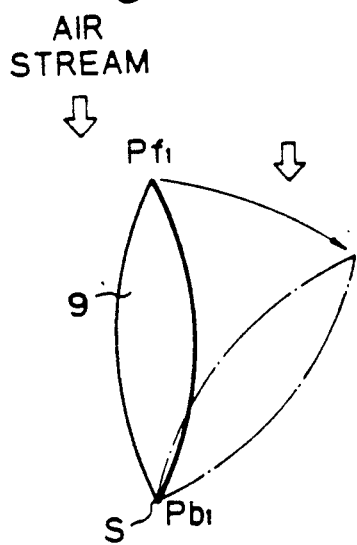
Figure 9C:
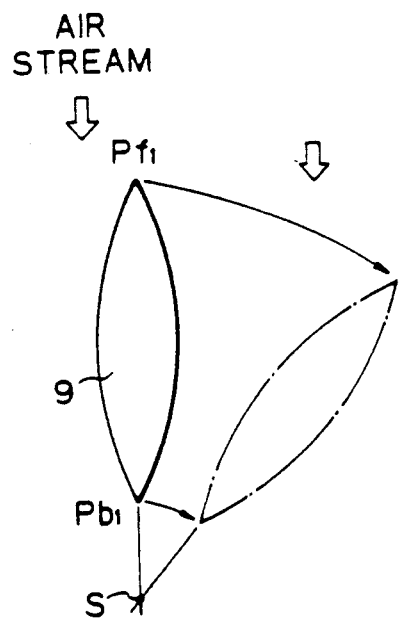

Referring to FIG. 1, 1a designates the air outlet of a wind tunnel, and 1b the air suction opening of the wind tunnel. A station 3 accommodating an object to be tested is arranged between the air inlet 1a and the suction opening 1b, and a motor vehicle 5 is placed on the station 3 so that the front face of the motor vehicle 5 is directed toward the air outlet 1a. A device for changing a direction of the airstream 7 is arranged on a peripheral flange portion 1c of the air outlet 1a. This device 7 comprises a plurality of spaced airstream direction control plates 9 arranged in parallel to each other in the plane perpendicular to the airstream flowing from the air outlet 1a. As illustrated in FIGS. 1 and 2, the airstream direction control plates 9 have a wing shape having a streamlined cross-section, and the downstream ends 9a of the airstream direction control plates 9 are pivotally connected to a support plate 13 via corresponding pivot pins 11. Each end of the support plate 13 is fixed to the flange portion 1c of the air outlet 1a via a support arm 13a. Action pins 15 are mounted on the top face of the airstream direction control plates 9 near to a position at which the airstream direction control plates 9 have a maximum thickness, and the airstream direction control plates 9 are pivotally connected to an action rod 17 via the action pins 15. One end of the action rod 17 is connected to the support arm 13a via a pivot pin 19, a hydraulic cylinder 21 and a pivot pin 23 and, as illustrated in FIGS. 1 and 3, the other end of the action rod 17 is connected to a support arm 29 via an expandable link mechanism comprising a stop plate 25 and a link plate 27. The support arm 29 is fixed to the flange portion 1c of the air inlet 1a, and thus this link mechanism serves to restrict the movement of the action rod 17 within a perdetermined range.

As illustrated in FIG. 2, the airstream direction control plates 9 are normally maintained at a position in which all of the airstream direction control plates 9 extend in the direction of the airstream flowing from the air outlet 1a. At this time, the airstream flows around the motor vehicle 5 along the longitudinal direction thereof, and thus the motor vehicle 5 is subject to an airstream acting on the front thereof. This corresponds to a state in which the motor vehicle 5 is running in still air.

Figure 10:
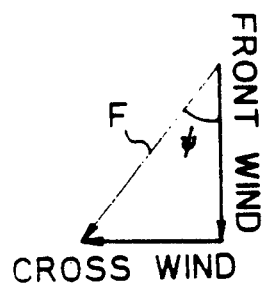
FIG. 10 is a diagram illustrating the deflecting angle.

When the hydraulic cylinder 21 is actuated by a hydraulic cylinder device (not shown), the tip end of the hydraulic cylinder 21 is moved in the direction illustrated by the arrow in FIG. 2, and the action rod 17 is moved in the direction illustrated by the arrow in FIGS. 2 and 3; namely, the action pins 15 allow a swing moment of the airstream direction control control plates 9. As a result, the airstream direction control plates 9 are swung about the corresponding pivot pins 11, and thus the direction of the airstream is changed. At this time, the motor vehicle 5 is subjected to an airstream from both the front and from the side, which simulates a condition wherein the motor vehicle 5 is subjected to a cross wind while running. At this time, the motor vehicle 5 is subjected to an airstream having a velocity vector F, which is obtained by compounding the velocity vector of the front airstream and the velocity vector of the cross airstream as illustrated in FIG. 10, and an angle $\psi$ of the velocity vector F relative to the velocity vector of the front airstream is called a deflecting angle. Namely, when the airstream direction control plates 9 are swung by the deflecting angle $\psi$ relative to the initial position thereof, the motor vehicle 5 is subjected to the airstream F from the deflecting angle $\psi$. When the hydraulic cylinder 21 is retracted, the airstream direction control plates 9 are returned to the initial position thereof, and at this time, the motor vehicle 5 is again subjected to only the front airstream.

FIGS. 4 (A) through (E) illustrate changes in the front and the cross airstreams to which the motor vehicle is subjected while actually running. In these figures, the stripes indicate an airstream flow, and are obtained by feeding smoke into the airstream at equidistant points therein, and each Figure illustrates the relative movement of the airstream with respect to the motor vehicle.

FIG. 4 (A) illustrates the state in which the motor vehicle is running in still air, and thus, at this time, the motor vehicle is subjected to only the front airstream. FIG. 4 (B) illustrates the state in which a cross airstream is generated in front of the motor vehicle, wherein P indicates a transition area between the front the and cross airstreams. This transition area P gradually approaches the motor vehicle, and FIG. 4 (C) illustrates the state in which the motor vehicle is subjected to the cross airstream; FIG. 4 (D) illustrates the state in which the transition state P is moving past the motor vehicle; and FIG. 4 (E) illustrates the state in which the motor vehicle is running in a stable cross airstream. FIG. 4 (A) through (E) illustrate an airstream to which the motor vehicle is subjected while actually running. At this time, as can be seen from FIGS. 4 (B), (C) and (D), the transition area P is extremely narrow, and thus it will be understood that the motor vehicle is subjected to an abrupt impact by a cross airstream. Consequently, to artificially create a state in the wind tunnel which simulates the actual state, the transition area must be made as narrow as possible.

FIGS. 5 (A) through (E) and FIGS. 6 (A) through (E) illustrate the result of experiments with the flow pattern in the station 3 in FIG. 1. These experiments were conducted by using the airstream direction control plates 9 having an NACA 644-021 wing shape in a state where a ratio V/W of the velocity of the front airstream V (m/sec) to the angular velocity W (degree/sec) is made 0.01 (m/degree).

FIGS. 5 (A) through (E) illustrate the case where the airstream direction control plates 9 are swung about the axes S thereof positioned at the downstream end of the airstream direction control plate 9, as illustrated in FIGS. 9 (B) and 11 (B). This corresponds to the embodiment illustrated in FIGS. 1 through 3.

Figure 11A:
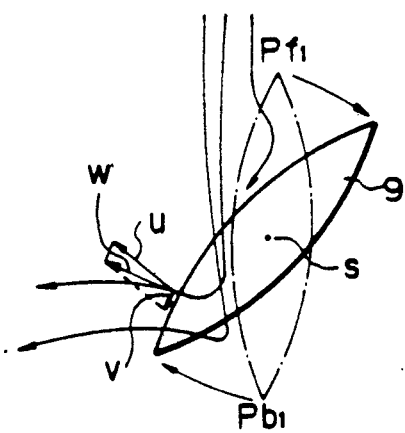
FIG. 11 (A) and (B) are schematically illustrated plan views of the airstream direction control plates.
Figure 11B:
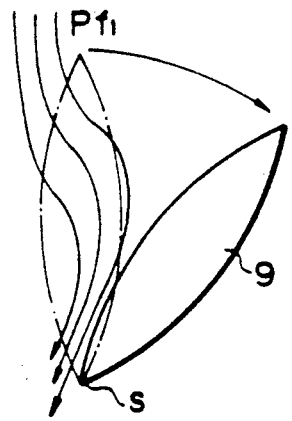

Conversely, FIGS. 6 (A) through (E) illustrate the case where the airstream direction control plates 9 are swung about the central axes thereof as illustrated in FIG. 9 (D) and FIG. 11 (A). This corresponds to the case where the airstream direction control plate disclosed in the above-mentioned Japanese Unexamined Patent Publication No. 61-110024 is applied to the device according to the present invention.

FIGS. 5 (A) and 6 (A) illustrate the state where the airstream direction control plates 9 are maintained at the original position thereof, and FIGS. 5 (B) through (E) and FIGS. 6 (B) through (E) illustrate successive changes in the flow pattern in accordance with the swinging of the airstream direction control plates 9.

Where the axes S of the swing motion of the airstream direction control plates 9 are located at the centers of the airstream direction control plates 9, as illustrated in FIG. 11 (A), when the airstream direction control plates 9 are swung, the airstream flowing along the downstream half (S to Pb1) of the airstream direction control plates 9 at a velocity V is turned outward at the velocity U by the airstream direction control plates 9. As a result, since the air stream has the velocity vector W, the direction of flow of the airstream is considerably deflected, and thus the airstream flows in a direction perpendicular to the original direction of flow thereof. That is, since the entire airstream flowing along the downstream half (S to Pb1) of the airstream direction control plates 9 is caused to flow in a direction perpendicular to the original direction thereof, the airstream is gently but considerably curved as illustrated in FIGS. 6 (C) and (D), and thus the transition area $\Delta B$ becomes very wide.

Conversely, where the axes S of the swing motion of the airstream direction control plates 9 are located at the downstream end of the airstream direction control plates 9, as illustrated in FIG. 11 (B), when the airstream direction control plates 9 are swung, the airstream flowing along the airstream direction control plate 9 follows the movement of the airstream direction control plate 9 and thus flows toward the airstream direction control plate 9. Namely, as illustrated by arrows in FIG. 11 (B), the airstream flows along the airstream direction control plates 9. Consequently, in this case, since the flow direction of the entire airstream is abruptly changed to the direction in which the wind direction control plates 9 extend, the airstream is abruptly changed from a front airstream to a combined front and cross airstream as illustrated in FIGS. 5 (C) and (D), and thus the transition area $\Delta B$ becomes narrow. Consequently, it can be understood that the flow pattern illustrated in FIGS. 5 (C) and (D) is closer to the actual flow pattern illustrated in FIGS. 4 (B), (C) and (D) than the flow pattern illustrated in FIGS. 6 (C) and (D).

FIG. 9 (E) illustrates the case where the axes S of the swing motion of the airstream direction control plates 9 are positioned on the upstream side of the airstream direction control plate 9. In this case, it is obvious that the flow pattern is far different to the actual flow pattern than the flow pattern obtained by using the airstream direction control plates 9 illustrated in FIG. 9 (D).

Conversely, where the axes S of the swing motion of the airstream direction control plates 9 are positioned on the downstream side of the airstream direction control plates 9, as illustrated in FIG. 9 (A), since the length of the airstream direction control plate 9 downstream of the axis S is relatively short, it is possible to obtain a flow pattern similar to the flow pattern illustrated in FIGS. 5 (C) and (D). In this case it has been proven that, if a ratio X/L of the distance X between the axis S and the downstream end of the airstream direction control plate 9 to the entire length L of the airstream direction control plate 9 in the direction of flow of the airstream is lower than ¼, a satisfactory flow pattern can be obtained. In addition, where the axis S of the swing motion of the airstream direction control plate 9 is positioned apart from the airstream direction control plate 9 as illustrated in FIG. 9 (C), a flow pattern similar to the flow pattern illustrated in FIGS. 5 (C) and (D) can be obtained. In this case, it has been proven that, if the ratio X/L is smaller than ¼, a satisfactory flow pattern can be obtained.

In addition, the above-mentioned ratio V/W influences the width of the transition area ΔB. FIGS. 7 (A) through (E) and FIGS. 8 (A) through (E) illustrate the result of experiments conducted to check this influence. Namely, FIGS. 7 (A) through (E) illustrate changes in the flow pattern where V=30 [m/s], V=0.04 [m/degree] and the airstream direction control plates 9 are swung by 30 degrees. Conversely, FIGS. 8 (A) through (E) illustrate changes in the flow pattern where V=8 [m/sec], V/W=0.01 [m/degree] and the airstream direction control plates 9 are swung by 30 degrees. As can be seen from FIGS. 7 (A) through (E) and FIG. 8 (A) through (E), in the case illustrated in FIGS. 7 (A) through (E), the flow patterns have a large arc shape, and thus the transition area becomes wide. Conversely, in the case illustrated in FIGS. 8 (A) through (E), the flow patterns are sharply bent, and thus the transition area becomes narrow. Consequently, the flow patterns illustrated in FIGS. 8 (A) through (E) are closer to the actual flow patterns than the flow patterns illustrated in FIGS. 7 (A) through (E). This is because a faster change from the front airstream to the combined front and cross airstreams is obtained as the velocity V of the front wind becomes lower and/or as the angular velocity w becomes higher. From these experiments, it will be understood that preferably V/W is lower than 0.01 (m/degree).

In addition, to obtain a stable airstream having the deflecting angle ψ after the airstream direction control plates 9 have been swung, preferably the nondimensional pitch P (the distance between adjacent airstream direction control plates 9/the maximum thicknesses of the wind direction control plates 9) of the airstream direction control plates 9 is more than 2.0 but less than 4.1. If the nondimensional pitch P is less than 2.0, large fluctuations of the velocity of the airstream can occur, and if the nondimensional pitch P is higher than 4.1, it is difficult to control the deflecting angle 4 by the swing angle of the airstream direction control plates 9.

Further, it is possible to stabilize the airstream by preventing a separation of the boundary layer on the surface of the airstream direction control plates 9. For example, the airstream may be stabilized by arranging a tripping wire on the surface of the airstream direction control plate 9 to promote the transition to a turbulent flow. In addition, the airstream may be stabilized by arranging leading edge slats in front of the corresponding airstream direction control plates 9. In this case, these leading edge slats are arranged in parallel to the airstream flowing from the air outlet 1a, at a position such that they prevent the separation of the boundary layer on the surfaces of the airstream direction control plates 9 when the airstream direction control plates 9 are swung. Furthermore, the airstream may be stabilized by forming slots or small bores on the surfaces of the airstream direction control plates 9, which function as a sink by sucking a part of the airstream into these slots or small bores.

According to the present invention, by positioning the axes of the swung motion of the airstream direction control plates on the downstream side thereof, it is possible to artificially create a flow pattern close to the actual flow pattern obtained when a vehicle encounters a cross wind while actually running.

While the invention has been described with reference to specific embodiments chosen for purposes of illustration, it should be apparent that numerous modifications could be made thereto by those skilled in the art without departing from the basic concept and scope of the invention.

We claim:

1. A device for changing a direction of an airstream flowing out of the air outlet of a wind tunnel toward an object to be tested so as to subject the object selectively to a front wind and a cross wind, said device comprising:
    a plurality of spaced airstream direction control plates arranged in parallel in a plane extending perpendicularly to the direction of flow of the air steam; and
    means for swinging said airstream direction control plates about corresponding swing axes extending along said plane by a predetermined angular degree from a position whereat said airstream direction control plates extend in parallel to the direction of flow of the air steam, said swing axes being positioned on the downstream side of said corresponding airstream direction control plates, the ratio of a distance between said swing axes and said downstream ends of said corresponding airstream direction control plates to an entire length of said airstream direction control plates in the direction of flow of the airstream is smaller than ¼.

2. A device according to claim 1, wherein said swing axes are positioned at the downstream ends of said airstream direction control plates.

3. A device for changing a direction of an airstream by changing a direction of an airstream flowing from an air outlet, said device comprising:
    a plurality of spaced airstream direction control plates arranged in parallel in a plane extending perpendicularly to the direction of flow of the air steam; and means for swinging said airstream direction control plates about corresponding swing axes extending along said plane by a predetermined angular degree from a position whereat said airstream direction control plates extend in parallel to the direction of flow of the air steam, said swing axes being positioned on the downstream side of said corresponding airstream direction control plates, said swinging means being operative to swing said airstream direction control plates at a predetermined angular velocity (degree/sec), the ratio of velocity of the air steam (m/sec) to said predetermined angular velocity is lower than 0.01.

4. A device for changing a direction of an airstream by changing a direction of flow of an airstream flowing from an air outlet, said device comprising:
- a plurality of spaced airstream direction control plates arranged in parallel in a plane extending perpendicularly to the direction of flow of the air steam; and
- means for swinging said airstream direction control plates about corresponding swing axes extending along said plane by a predetermined angular degree from a position whereat said airstream direction control plates extend in parallel to the direction of flow of the air steam, said swing axes being positioned on the downstream side of said corresponding airstream direction control plates, said airstream direction control plates have a wing shape and being arranged equidistantly from each other, and the ratio of a distance between adjacent airstream direction control plates to a maximum thickness of said airstream direction control plates being more than 2.0 and less than 4.1.

5. In a wind tunnel for testing an object in an airstream flowing from an air outlet, a device for changing a direction of flow of the airstream, said device comprising:
- a plurality of spaced airstream direction control plates arranged in parallel in a plane extending perpendicularly to the direction of flow of the air steam; and
- means for swinging said airstream direction control plates about respective swing axes extending along said plane by a predetermined angular degree from a position whereat said airstream direction control plates extend in parallel to the direction of flow of the air steam, said swing axes being positioned on the downstream side of said airstream direction control plates, respectively.

6. In a wind tunnel for testing an object in an airstream flowing from an air outlet and including means for changing a direction of flow of the airstream, said means comprising a plurality of spaced airstream direction control plates arranged in parallel in a plane extending perpendicularly to the direction of flow of the air steam, and means for swinging said airstream direction control plates about corresponding swing axes extending along said plane by a predetermined angular degree from a position at which said airstream direction control plates extend in parallel to the direction of flow of the air steam, the improvement comprising:
- means for positioning said swing axes on the downstream side of said corresponding airstream direction control plates.

* * * * *

UNITED STATES PATENT AND TRADEMARK OFFICE
CERTIFICATE OF CORRECTION

PATENT NO. : 5,035,359
DATED : July 30, 1991
INVENTOR(S) : MINORU YAMADA ET AL.

It is certified that error appears in the above-identified patent and that said Letters Patent is hereby corrected as shown below:

Claim 1, column 6, lines 44 and 45, change "air steam" to --airstream--;
line 51, change "air steam" to --airstream--.

Claim 3, column 6, lines 67 and 68, change "air steam" to --airstream--;
column 7, line 6, change "air steam" to --airstream--;
line 13, change "air steam" to --airstream--.

Claim 4, column 7, lines 20 and 21, change "air steam" to --airstream--;
line 28, change "air steam" to --airstream--.

Claim 5, column 8, lines 9 and 10, change "air steam" to --airstream--;
line 16, change "air steam" to --airstream--.

Claim 6, column 8, line 25, change "air steam" to --airstream--;

UNITED STATES PATENT AND TRADEMARK OFFICE
CERTIFICATE OF CORRECTION

PATENT NO.  : 5,035,359
DATED       : July 30, 1991
INVENTOR(S) : Minoru Yamada, et al.

It is certified that error appears in the above-identified patent and that said Letters Patent is hereby corrected as shown below:

Column 8, claim 6, line 30, change "air steam" to --airstream--.

Signed and Sealed this

Tenth Day of November, 1992

*Attest:*

DOUGLAS B. COMER

*Attesting Officer*     *Acting Commissioner of Patents and Trademarks*